(12) United States Patent
Ghosh

(10) Patent No.: US 8,649,254 B2
(45) Date of Patent: Feb. 11, 2014

(54) DELAY RESTRICTED CHANNEL ESTIMATION FOR MULTI-CARRIER SYSTEMS

(71) Applicant: AT&T Intellectual Property I, L.P., Atlanta, GA (US)

(72) Inventor: Arunabha Ghosh, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 13/632,689

(22) Filed: Oct. 1, 2012

(65) Prior Publication Data

US 2013/0051450 A1    Feb. 28, 2013

Related U.S. Application Data

(63) Continuation of application No. 13/163,996, filed on Jun. 20, 2011, now Pat. No. 8,305,874, which is a continuation of application No. 12/467,764, filed on May 18, 2009, now Pat. No. 7,986,614, which is a continuation of application No. 11/046,192, filed on Jan. 28, 2005, now Pat. No. 7,551,547.

(51) Int. Cl.
*H04J 11/00* (2006.01)

(52) U.S. Cl.
USPC ............ 370/208; 370/210; 370/329; 370/343

(58) Field of Classification Search
USPC ................. 370/208, 335, 342, 210, 329, 343; 375/148, 150, 267; 455/101
See application file for complete search history.

(56) References Cited

U.S. PATENT DOCUMENTS

| 5,715,280 | A  | 2/1998  | Sandberg et al. |
| 6,275,525 | B1 | 8/2001  | Bahai et al. |
| 6,327,314 | B1 | 12/2001 | Cimini, Jr. et al. |
| 6,990,061 | B2 | 1/2006  | Deneire et al. |
| 6,996,195 | B2 | 2/2006  | Kadous |
| 6,999,538 | B2 | 2/2006  | Kung et al. |
| 7,027,519 | B2 | 4/2006  | Bao et al. |
| 7,031,250 | B2 | 4/2006  | Vandenameele-Lepla |
| 7,151,809 | B2 | 12/2006 | Ketchum et al. |
| 7,161,973 | B2 | 1/2007  | Ghosh |
| 7,181,177 | B2 | 2/2007  | Pauli et al. |
| 7,206,349 | B2 | 4/2007  | Linnartz et al. |
| 7,295,624 | B2 | 11/2007 | Onggosanusi et al. |

(Continued)

FOREIGN PATENT DOCUMENTS

| JP | 2001289234 A | 10/2001 |
| WO | 2005076318 A2 | 8/2005 |
| WO | 2006083419 A2 | 8/2006 |

OTHER PUBLICATIONS

International Search Report/Written Opinion for International Application No. PCT/US05/46231, Mailed on October 25, 2006.

(Continued)

*Primary Examiner* — Hassan Kizou
*Assistant Examiner* — Toan Nguyen
(74) *Attorney, Agent, or Firm* — Toler Law Group, PC

(57) ABSTRACT

A method includes multiplying, at a device, a suppressed estimate of a channel by a first matrix to obtain a delay restricted estimate of the channel. The method also includes demodulating a signal received via the channel based at least in part on the delay restricted estimate of the channel.

16 Claims, 6 Drawing Sheets

(56) References Cited

U.S. PATENT DOCUMENTS

| | | |
|---|---|---|
| 7,324,584 B1 * | 1/2008 | Vigneron et al. ............ 375/150 |
| 7,336,694 B2 | 2/2008 | Ghosh |
| 7,355,958 B2 | 4/2008 | Chen |
| 7,376,106 B2 | 5/2008 | Ben-David et al. |
| 7,391,833 B2 | 6/2008 | Kim et al. |
| 7,412,005 B2 | 8/2008 | Wang et al. |
| 7,450,668 B2 | 11/2008 | Ghosh et al. |
| 7,657,269 B2 | 2/2010 | Suryanarayana et al. |
| 7,684,507 B2 | 3/2010 | Levy |
| 7,746,919 B2 | 6/2010 | Ghosh |
| 7,907,685 B2 | 3/2011 | Chen |
| 7,986,614 B2 | 7/2011 | Ghosh et al. |
| 8,036,685 B2 | 10/2011 | Suryanarayana et al. |
| 8,046,019 B2 | 10/2011 | Hosein |
| 2001/0017883 A1 | 8/2001 | Tiirola et al. |
| 2002/0041624 A1 * | 4/2002 | Kim et al. .................... 375/148 |
| 2002/0191535 A1 | 12/2002 | Suguyama et al. |
| 2004/0218697 A1 | 11/2004 | Liu |
| 2005/0047488 A1 * | 3/2005 | Sugahara .................... 375/148 |
| 2005/0128966 A1 | 6/2005 | Yee |
| 2005/0129136 A1 | 6/2005 | Fujii et al. |
| 2005/0250466 A1 | 11/2005 | Varma et al. |
| 2006/0120275 A1 | 6/2006 | Muck et al. |
| 2006/0209974 A1 | 9/2006 | Yoshida |
| 2007/0058735 A1 | 3/2007 | Ghosh |
| 2007/0080783 A1 | 4/2007 | Ghosh et al. |
| 2008/0130621 A1 | 6/2008 | Ghosh |
| 2009/0074115 A1 | 3/2009 | Ghosh et al. |
| 2009/0274252 A1 | 11/2009 | Ghosh |
| 2011/0243284 A1 | 10/2011 | Ghosh |

OTHER PUBLICATIONS

Notice of Allowance for U.S. Appl. No. 13/163,996 mailed Jul. 2, 2012, 14 pages.

Notice of Allowance for U.S. Appl. No. 13/163,996 mailed Mar. 8, 2012, 13 pages.

Non-Final Office Action for U.S. Appl. No. 13/163,996 mailed Nov. 8, 2011, 31 pages.

* cited by examiner (PRIOR ART)

DELAY RESTRICTED CHANNEL ESTIMATION FOR MULTI-CARRIER SYSTEMS

CROSS-REFERENCE TO RELATED APPLICATIONS

The present application claims priority from and is a continuation of patent application Ser. No. 13/163,996, filed on Jun. 20, 2011, now U.S. Pat. No. 8,305,874 and entitled "DELAY RESTRICTED CHANNEL ESTIMATION FOR MULTI-CARRIER SYSTEMS," which is a continuation of patent application Ser. No. 12/467,764, filed on May 18, 2009, now U.S. Pat. No. 7,986,614 and entitled "DELAY RESTRICTED CHANNEL ESTIMATION FOR MULTI-CARRIER SYSTEMS," which is a continuation of patent application Ser. No. 11/046,192, filed on Jan. 28, 2005, now U.S. Pat. No. 7,551,547, and entitled "DELAY RESTRICTED CHANNEL ESTIMATION FOR MULTI-CARRIER SYSTEMS," the contents of which are expressly incorporated herein by reference in their entirety.

FIELD OF THE DISCLOSURE

The present disclosure relates to methods and systems for channel estimation of multi-carrier modulation transmissions.

BACKGROUND

In recent years, Orthogonal Frequency Division Multiplexing (OFDM) has attracted attention as a candidate for high-data-rate video and multimedia communications. OFDM belongs to a family of transmission schemes called multi-carrier modulation. Multi-carrier modulation is based on dividing a given high bit-rate data stream into several parallel low bit-rate data streams and modulating each stream on separate sub-carriers.

The motivation for using multi-carrier modulation is to overcome the problem of inter-symbol interference (ISI). In wireless channels where radio signals from a transmitter traverse multiple paths to a receiver, all the signal energy does not necessarily arrive at the receiver at the same instant of time. This phenomenon of dispersion in a communication channel causes energy from one symbol duration to spill into succeeding symbol durations.

When a time delay due to dispersion is either a significant fraction of or more than the symbol time duration, the resultant ISI can be detrimental. ISI causes an irreducible error floor that cannot be overcome by simply changing a radio frequency (RF) parameter such as a transmit power, an antenna pattern or a frequency plan.

In an OFDM system, each sub-carrier can be viewed as a flat fading channel. A single tap equalizer can be used to equalize the transmitted signal in case of coherent demodulation. This requires the receiver to have knowledge of the channel on a per-sub-carrier basis.

The discrete baseband time representation of a transmitted OFDM signal is:

$$y_{n,m} = \sum_{k=o}^{N-1} x_{k,m} e^{j2\pi(k-\frac{N}{2})\frac{n}{N}} \quad (1)$$

where $x_{k,m}$ represents the sub-carrier symbols, N is the number of sub-carriers, k is the modulated symbol index, m is the OFDM symbol index, n is a sub-carrier index, and j represents the square root of −1.

The discrete version of the OFDM baseband signal shown in equation (1) is identical to the Inverse Discrete Fourier Transform (IDFT) of the sub-carrier symbols $x_{n,m}$. Thus, OFDM modulation is essentially identical to an IDFT operation which may be performed using an Inverse Fast Fourier Transform (IFFT). FIG. 1 (prior art) is a block diagram of a baseband representation of an OFDM transmitter. The OFDM transmitter comprises a serial-to-parallel converter 10, an IFFT processor 12, and a parallel-to-serial converter 14.

FIG. 2 (prior art) is a graph illustrating frequency synchronization of an OFDM signal. The graph illustrates spectral component versus frequency for the case of using four tones.

The sub-carrier data symbols can be estimated at a receiver by taking the Discrete Fourier Transform (DFT) such as a Fast Fourier Transform (FFT) of a received and equalized OFDM symbol using the following equation.

$$\hat{x}_{n,m} = \frac{1}{N}\sum_{k=o}^{N-1} y_{k,m} e^{-j2\pi(n-\frac{N}{2})\frac{k}{N}} \quad (2)$$

In a time dispersive channel such as one which introduces multipath fading, the signal at the receiver can be written as a convolution of the transmitted signal y and the channel impulse response h. Thus, the received signal $r_{n,m}$ in the discrete time domain can be written as:

$$r_{n,m} = \sum_{l=o}^{L-1} h_l y_{n-l,m} \quad n \geq L \quad (3a)$$

$$r_{n,m} = \sum_{l=o}^{n} h_l y_{n-l,m} + \sum_{l=n+1}^{L-1} h_l y_{N-(l-n),m-1} \quad n < L \quad (3b)$$

where L is the length of the channel impulse response in units of sample time.

No ISI is observed in received signal when n=L. However when n<L, the signal from the previous OFDM symbol is corrupted by the received signal. If the cyclic prefix is longer than the channel impulse response, then the effect of the previous OFDM symbol is not seen in the usable part of the signal (i.e. the part of the OFDM symbol after the cyclic prefix). From here onward, it is assumed herein that the cyclic prefix is longer than the channel impulse response, thus ignoring the second term in equation (3b). Under this assumption, the demodulated signal in each sub-carrier is given by:

$$s_{n,m} = \frac{1}{N}\sum_{k=0}^{N-1} r_{k,m} e^{-j2\pi(n-\frac{N}{2})\frac{k}{N}} = \frac{1}{N}\sum_{k=0}^{N-1}\sum_{l=0}^{L-1} h_l y_{k-l,m} e^{-j2\pi(n-\frac{N}{2})\frac{k}{N}} = \lambda_n x_{n,m} \quad (4)$$

where $\lambda_n$ is the DFT of the channel impulse response.

Even though the channel is time dispersive, the effect of the channel can be visualized in the frequency domain (i.e. after the DFT) by a single multiplicative constant $\lambda_n$ for each of the sub-carriers. This results because a convolution operation in the time domain translates to a simple multiplication in the frequency domain. A single-tap equalization using a zero-forcing equalizer can be used to estimate the sub-carrier signal using the following equation.

$$\hat{x}_{n,m} = \frac{s_{n,m}}{\lambda_{n,m}} \quad (5)$$

However, in order to use equation (5), the receiver needs to know the channel response in the frequency domain (i.e. the values of $\lambda_n$).

The channel response may be estimated either by embedding pilot symbols within data stream or by using preambles. The known pilot or preamble symbols are used to estimate the channel on the given sub-carriers. To estimate the channel in other sub-carriers, a subsequent channel interpolation can be performed.

Existing channel estimation techniques include zero forcing and linear minimum mean square error (LMMSE). Zero-forcing channel estimation can be performed over known pilot and/or preamble symbols by dividing the received symbol by the expected symbol.

$$\hat{\lambda}_n = \frac{s_{n,m}}{x_{n,m}} \quad (6)$$

A disadvantage of a zero forcing estimate is its unreliability in low signal-to-noise ratio (SNR) conditions. For example, a zero-forcing-estimated channel response can be significantly inaccurate if some of the sub-carriers experience a deep fade.

The LMMSE channel estimator is designed to minimize the mean square error between an estimated channel response and an actual channel response. For convenience in formulating the LMMSE estimator, the relationship between received and transmitted symbols in the sub-carriers carrying the pilot/preamble is represented in the following vector form:

$$S = P\Lambda + W, \text{ or} \quad (7)$$

$$\begin{bmatrix} s_0 \\ s_1 \\ \vdots \\ s_{M-1} \end{bmatrix} = \begin{bmatrix} p_0 & 0 & \cdots & 0 \\ 0 & p_1 & & 0 \\ \vdots & & \ddots & \vdots \\ 0 & 0 & \cdots & p_{M-1} \end{bmatrix} \begin{bmatrix} \lambda_0 \\ \lambda_1 \\ \vdots \\ \lambda_{M-1} \end{bmatrix} + \begin{bmatrix} w_0 \\ w_1 \\ \vdots \\ w_{M-1} \end{bmatrix}$$

where $s_i$ and $p_i$ are the received and transmitted symbols in the sub-carriers carrying the pilot/preamble, and $w_i$ represents noise. The noise can be assumed to be additive, Gaussian white noise.

The LMMSE estimate $\hat{\Lambda}$ of the channel impulse response is determined by the following equation:

$$\hat{\Lambda} = AS = AP\Lambda + AW \quad (8)$$

where A is an estimation matrix.

The estimation matrix A is determined by the following equation:

$$A = R_\lambda [R_{\lambda+}(P^H P)^{-1} \Sigma]^{-1} P^{-1}. \quad (9)$$

where $R_\lambda$ is the covariance matrix of the channel impulse response and $\Sigma$ is the covariance matrix of the noise vector and usually is a diagonal matrix.

In the absence of noise, the covariance matrix $\Sigma$ is equal to a zero matrix. If the fading in the different sub-carriers is independent, the covariance matrix $R_\lambda$ of the channel impulse response is an identity matrix. Under both of these two conditions, the LMMSE estimate is identical to the zero forcing estimate.

A drawback of the LMMSE channel estimation scheme is its requiring knowledge of the correlation between the fades of different sub-carriers to form the covariance matrix $R_\lambda$. In most practical systems, this information is not known at the receiver a priori, thus making the LMMSE estimator impractical.

Channel estimation and equalization are fundamental components of wireless communication systems, especially those that have been designed to work in a non-line-of-sight condition. In multi-carrier systems such as OFDM, equalization is relatively straightforward, but sophisticated channel estimation and channel interpolation techniques are presently required.

BRIEF DESCRIPTION OF THE DRAWINGS

The present invention is pointed out with particularity in the appended claims. However, other features are described in the following detailed description in conjunction with the accompanying drawings in which:

DETAILED DESCRIPTION

Figure 1:
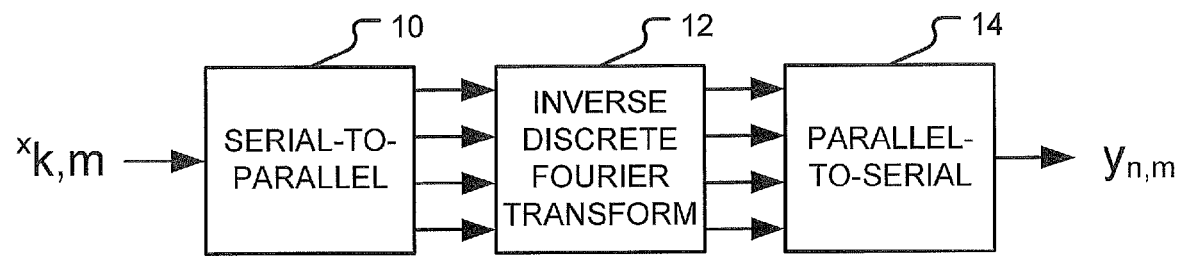
FIG. 1 (prior art) is a block diagram of a baseband representation of an OFDM transmitter.
Figure 2:
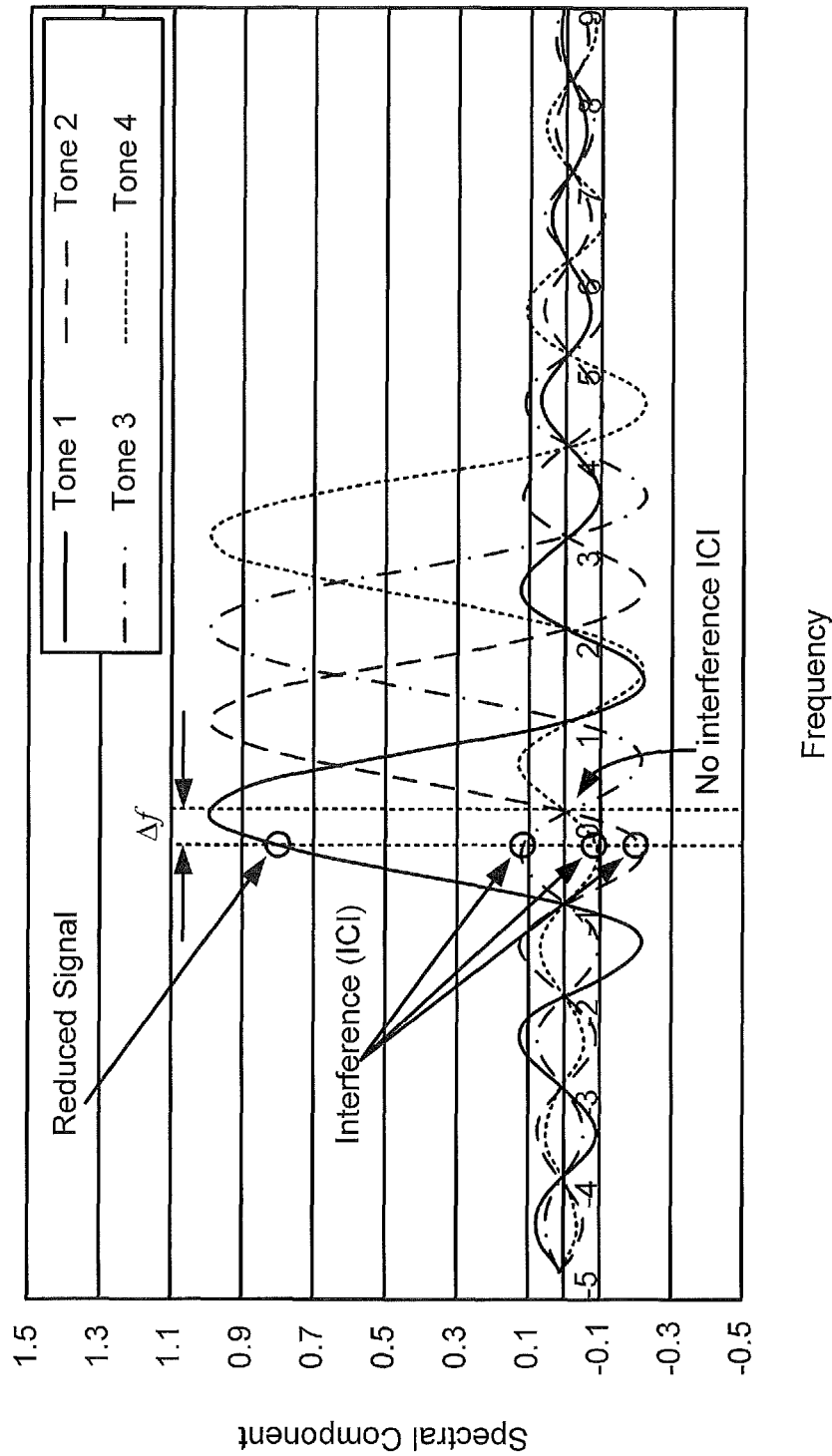
FIG. 2 (prior art) is a graph illustrating frequency synchronization of an OFDM signal.

In a particular embodiment, a method includes performing a channel estimation to obtain an estimate of a channel based on a received signal. The method also includes suppressing a subset of elements of the estimate of the channel to obtain a suppressed estimate of the channel. The method further includes multiplying the suppressed estimate of the channel by a matrix to obtain a delay restricted estimate of the channel.

In another particular embodiment, an apparatus includes a channel estimator configured to compute a channel estimate based on a received signal. The apparatus also includes a suppressor to suppress a subset of elements of the channel estimate to obtain a suppressed channel estimate of the channel. The suppressor is further configured to suppress a particular element by setting the particular element to zero. The apparatus further includes a multiplier configured to multiply the suppressed channel estimate by a matrix to obtain a delay restricted estimate of the channel.

In another particular embodiment, a computer readable storage medium includes instructions that, when executed by a processor, cause the processor to perform a channel estimation to obtain an estimate of a channel based on a received signal. The instructions, when executed by the processor, also cause the processor to suppress a subset of elements of the estimate of the channel to obtain a suppressed estimate of the channel. The instructions, when executed by the processor, further cause the processor to multiply the suppressed estimate of the channel by a matrix to obtain a delay restricted estimate of the channel. The matrix is a unitary matrix obtained from a singular value decomposition of a Fourier transform matrix.

Existing frequency domain channel estimation schemes for OFDM do not incorporate information that the channel impulse response exists only over a finite number of samples in the time domain because the delay spread of the environment is finite and much smaller than the OFDM symbol duration. This assumption can be made since the delay spread of most environments is of the order of a few microseconds, e.g. 15-20 microseconds in some environments. Thus, in the time domain, a span of channel impulse response is essentially limited.

Described herein are embodiments of delay restricted channel estimation methods and systems that take into account a finite spread of the channel impulse response in the time domain to improve the accuracy of channel estimation in the frequency domain. The new methods can be used for preamble-based or pilot-based channel estimation.

The disclosed methods provide channel estimates that are less susceptible to noise. As a benefit, the disclosed methods also allow for estimation of a multi-carrier noise variance estimation. Simulation results show a 2 dB improvement in the link performance by implementing a particular disclosed channel estimation method when compared to traditional channel estimation schemes such as zero forcing and LMMSE.

The delay restricted channel estimation can be based on a zero-forcing estimate, an LMMSE estimate, or an alternative estimate with an additional constraint that the impulse response of the channel exists only over a finite and known interval of time.

A vector $\Lambda$ comprising the values $\lambda_n$ from equation (4) is related to a DFT matrix F and a channel impulse response vector H by the following equation:

$$\Lambda = FH, \text{ or} \quad (10)$$

$$\begin{bmatrix} \lambda_0 \\ \lambda_1 \\ \vdots \\ \lambda_{N-1} \end{bmatrix} = \begin{bmatrix} F_{0,0} & \cdots & F_{0,L-1} \\ \vdots & \ddots & \vdots \\ F_{N-1,0} & \cdots & F_{N-1,L-1} \end{bmatrix} \begin{bmatrix} h_0 \\ \vdots \\ h_{L-1} \end{bmatrix}.$$

The elements of the DFT matrix F are given by:

$$F_{i,k} = e^{-j2\pi(i-\frac{N}{2})\frac{k}{N}}, \text{ for } k < L. \quad (11)$$

The DFT matrix F is an N×L matrix of rank L, where L is the number of taps over which the channel impulse response exists. A singular value decomposition of the DFT matrix F can be performed to determine a unitary transformation U and V such that $$F = U\overline{F}V^H \Rightarrow \overline{F} = U^H FV \quad (12)$$

where $\overline{F}$ is an N×L diagonal matrix containing the singular values of F, and U and V are N×N and L×L dimensional matrices respectively with unitary columns.

The matrices U and V can be viewed as unitary transformation operators in the frequency and time domains, respectively. In particular, the vector $\Lambda$ can be pre-multiplied by $U^H$ (i.e. the complex conjugate transpose of U) to form a transformed vector $\overline{\Lambda}$. The vector H can be pre-multiplied by $V^H$ (i.e. the complex conjugate transpose of V) to form a transformed vector $\overline{H}$. The relationship between $\overline{\Lambda}$, $\overline{F}$ and $\overline{H}$ is represented by the following equation:

$$\overline{\Lambda} = \overline{F}\overline{H}. \quad (13)$$

The matrix $\overline{F}$ has the following form.

$$\overline{F} = \begin{bmatrix} \overline{F}_0 & \cdots & 0 \\ \vdots & \ddots & \vdots \\ 0 & \cdots & \overline{F}_{L-1} \\ 0 & \cdots & 0 \\ \vdots & \ddots & \vdots \\ 0 & \cdots & 0 \end{bmatrix} \quad (14)$$

Based on the form of $\overline{F}$, the elements after the first L elements in the vector $\overline{\Lambda}$ are all zero.

$$\overline{\Lambda} = \begin{bmatrix} \overline{\lambda}_0 \\ \vdots \\ \overline{\lambda}_{L-1} \\ 0 \\ \vdots \\ 0 \end{bmatrix} \quad (15)$$

The unitary transformation U is used to modify a channel estimate, such as either the zero forcing or the LMMSE channel estimate, as follows. Once the estimate $\overline{\Lambda}$ has been evaluated, the elements $\overline{\lambda}_i$ for $i \geq L$ are suppressed to zero based on the form of $\overline{\Lambda}$ given by equation (15). The transformation U is used to transform $\overline{\Lambda}$ back to $\Lambda$ in the frequency domain, i.e. U is multiplied by $\overline{\Lambda}$ to obtain a delay-restricted estimate of $\Lambda$.

To show the derivation, both sides of equation (7) are multiplied by $U^H$ to transform the received symbol vector S, the transmitted symbol matrix P, the $\Lambda$ vector and the noise vector W.

$$U^H S = U^H P U U^H \Lambda + U^H W \quad (16)$$

Thus, equation (16) relates a transformed received symbol vector $\overline{S}$, a transformed transmitted symbol matrix $\overline{P}$, the transformed vector $\overline{\Lambda}$, and the transformed noise vector $\overline{W}$ according to the following equation.

$$\overline{S} = \overline{P}\overline{\Lambda} + \overline{W} \quad (17)$$

Since the transformation is unitary, the covariance matrices of the noise vector W and the transformed noise vector $\overline{W}$ are identical.

The delay-restricted zero-forcing channel estimate can be determined by: (i) determining the transformed vector $\overline{\Lambda}$ based on the equation:

$$\overline{\Lambda} = \overline{P}^{-1}\overline{S}; \quad (18)$$

(ii) suppressing all but the first L elements in $\overline{\Lambda}$ to zero; and (iii) transforming $\overline{\Lambda}$ back to $\Lambda$ using the following equation:

$$\Lambda = U\overline{\Lambda} \quad (19)$$

Similarly the delay-restricted LMMSE channel estimate can be determined by: (i) determining the transformed vector $\overline{\Lambda}$ based on the equation:

$$\overline{\Lambda} = R_{\overline{\Lambda}}[R_{\overline{\Lambda}} + (\overline{P}^H \overline{P})^{-1}\Sigma]^{-1}\overline{P}^{-1}\overline{S}; \quad (20)$$

(ii) suppressing all but the first L elements in $\bar{\Lambda}$ to zero; and
(iii) transforming $\bar{\Lambda}$ back to $\Lambda$ using the following equation:

$$\Lambda = U\bar{\Lambda}. \quad (21)$$

A traditional zero-forcing channel estimate does not allow noise variation estimation to be performed. However, by taking advantage of the finite spread of the channel impulse response in the time domain, the delay-restricted zero-forcing channel estimate enables estimation of a noise variance. The estimate of noise $\hat{W}$ is determined by subtracting the estimated signal from the received signal.

$$\hat{W} = r - P\hat{\Lambda} \quad (22)$$

A noise variance $\sigma^2$ is determined by an inner product of $\hat{W}^H$ and $\hat{W}$.

$$\sigma^2 = \langle \hat{W}^H \hat{W} \rangle \quad (23)$$

This approach to noise variance estimation is unsuitable for the case of a traditional zero-forcing estimate since a zero noise variance will result based on the definition of the zero-forcing estimate.

Figure 3:
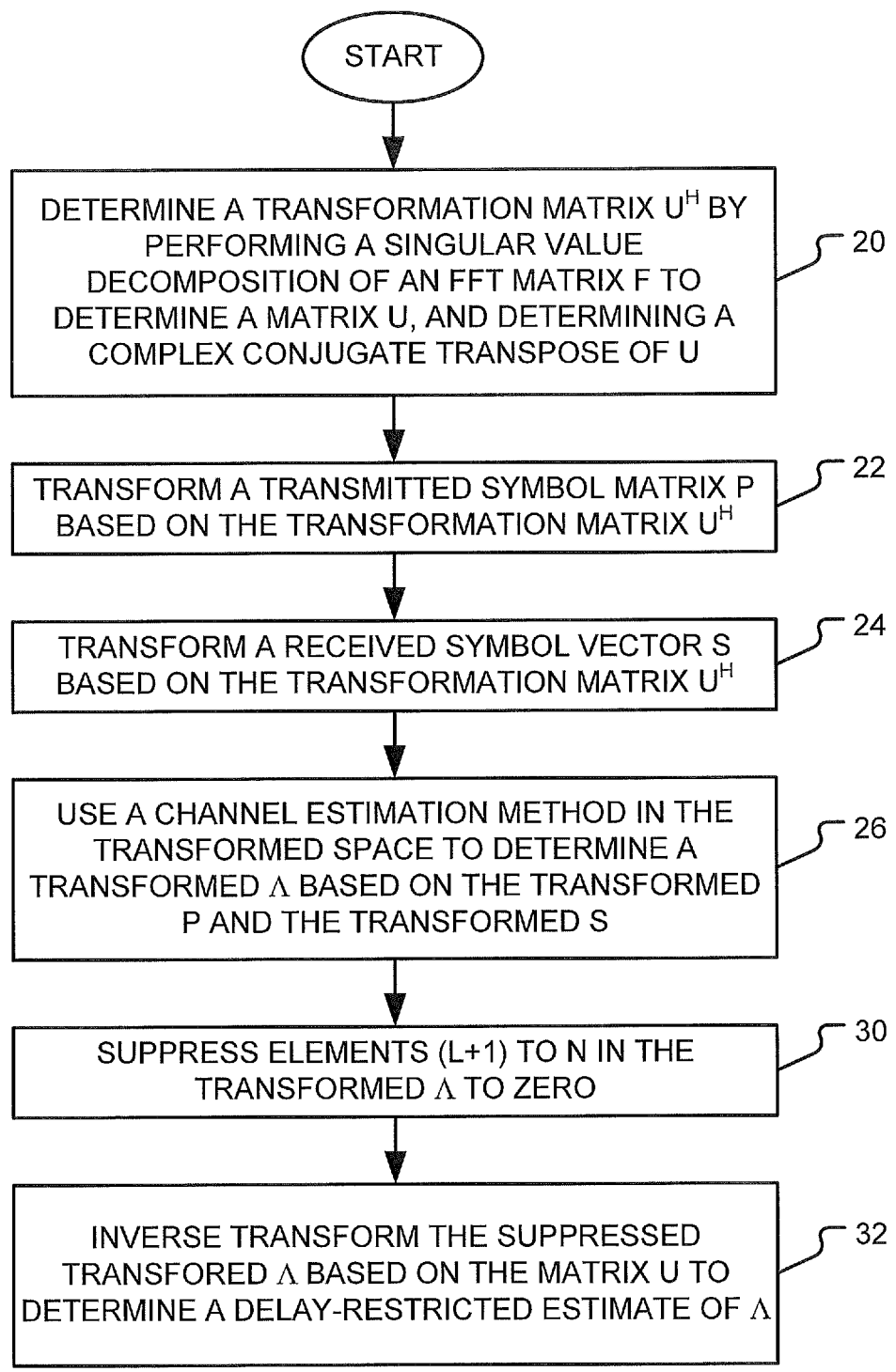
FIG. 3 is a flow chart summarizing an embodiment of a method of delay-restricted channel estimation.

FIG. 3 is a flow chart summarizing an embodiment of a method of delay restricted channel estimation. As indicated by block 20, the method comprises determining the transformation matrix $U^H$. The transformation matrix $U^H$ can be determined by performing a singular value decomposition of the DFT matrix, F, to determine the matrix U, and then determining the complex conjugate transpose of U.

As indicated by block 22, the method comprises transforming the transmitted symbol matrix P based on the transformation matrix $U^H$. The transformed transmitted symbol matrix $\bar{P}$ is equal to $U^H$ multiplied by P.

As indicated by block 24, the method comprises transforming the received symbol vector S based on the transformation matrix $U^H$. The transformed received symbol vector $\bar{S}$ is equal to $U^H$ multiplied by S.

As indicated by block 26, the method comprises determining a transformed vector $\bar{\Lambda}$ based on the transformed transmitted symbol matrix $\bar{P}$ and the transformed received symbol vector $\bar{S}$. The transformed vector $\bar{\Lambda}$ is determined using a channel estimation method such as zero-forcing, LMMSE, or an alternative method. For zero-forcing, $\bar{\Lambda}$ is determined using equation (18); for LMMSE, $\bar{\Lambda}$ is determined using equation (20).

As indicated by block 30, the method comprises suppressing all but the first L elements of the transformed vector $\bar{\Lambda}$ to zero. Thus, the first L elements (i.e. elements 1, 2, . . . , L) of the transformed vector $\bar{\Lambda}$ remain the same, and the remaining elements (i.e. elements L+1, L+2, . . . , N) are set to zero. It is noted that the scope of this disclosure includes variations wherein all elements after the $L^{th}$ element are not suppressed exactly to zero, but substantially to zero.

As indicated by block 32, the method comprises inverse transforming the suppressed, transformed vector $\bar{\Lambda}$ based on the matrix U (which is an inverse transformation of the matrix $U^H$) to determine a delay-restricted estimate of $\Lambda$. The delay-restricted estimate of $\Lambda$ is equal to U multiplied by $\bar{\Lambda}$ (see equations (19) and (21)). Although the $(L+1)^{st}$ to the $N^{th}$ elements in the transformed vector $\bar{\Lambda}$ are zero, the corresponding elements in $\Lambda$ are not necessarily zero. Moreover, it is likely that all N elements of $\Lambda$ are non-zero.

Figure 4:
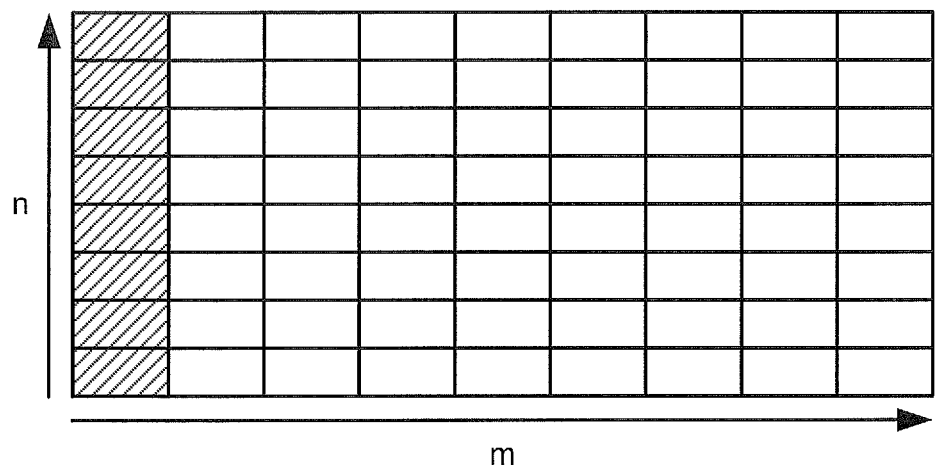
FIGS. 4 and 5 show symbol/sub-carrier combinations in pilot and preambles that can be used for delay-restricted channel estimation.
Figure 5:
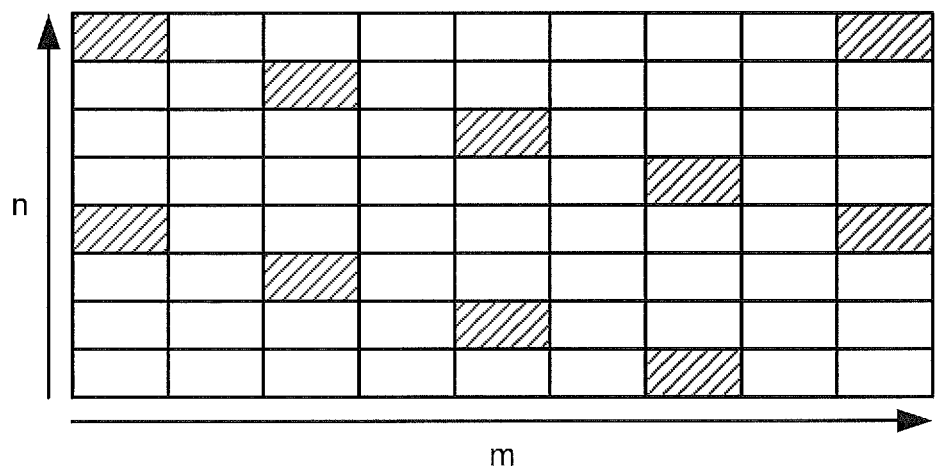

The method can be used to estimate the channel impulse response based on either pilots or preambles having symbol/sub-carrier combinations that are known a priori. FIGS. 4 and 5 show examples of pilots and preambles where symbol/sub-carrier combinations that are known a priori are shaded.

Figure 6:
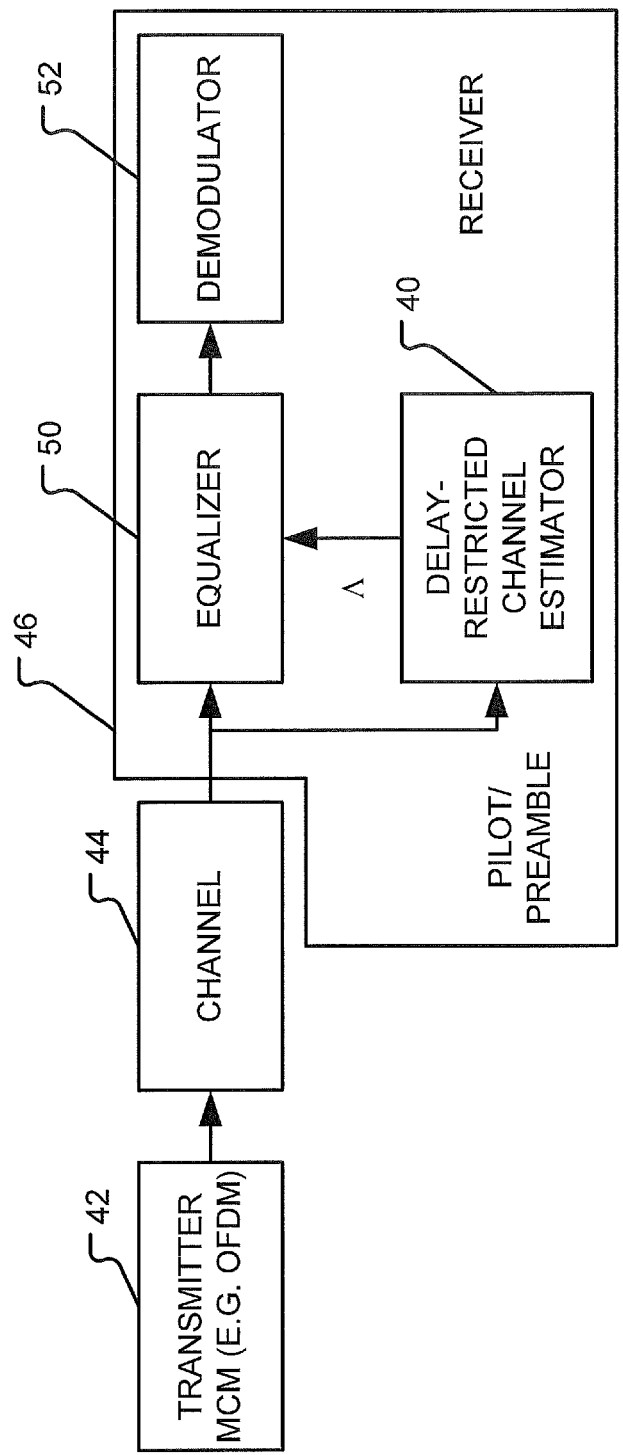
FIG. 6 is a block diagram of an embodiment of a communication system having a delay-restricted channel estimator.

FIG. 6 is a block diagram of an embodiment of a communication system having a delay-restricted channel estimator 40. A transmitter 42 modulates a signal using a multi-carrier modulation method such as OFDM. The modulated signal is transmitted over a communication channel 44 to a receiver 46. The receiver 46 comprises the delay-restricted channel estimator 40, which performs an embodiment of the method described with reference to FIG. 3 for known pilots and/or preambles contained in the transmitted signal. The delay-restricted channel estimator 40 outputs the $\Lambda$ vector to an equalizer 50. The equalizer 50 equalizes the received signal based on the $\Lambda$ vector. A demodulator 52 demodulates an equalized signal from the equalizer 50.

Simulations of the delay-restricted channel estimation method were performed for an IEEE 802.16(d) system. The IEEE 802.16(d) system is a 256 sub-carrier based OFDM system that has been designed to provide high data rate and high QoS for wireless broadband access.

A 3GPP-based multipath channel (TS 25.996) was used to simulate the effect of a wireless non-line-of-sight (non-LOS) channel on a baseband signal. At the receiver, realistic channel estimation and frequency synchronization algorithms were used to keep the simulation close to real world performance of such systems.

TABLE I shows the parameters of the simulations.

TABLE I

| | |
|---|---|
| Channel Bandwidth | 5 MHz |
| Oversampling | 7/6 |
| Modulation | BPSK, QPSK, 16QAM, & 64 QAM |
| Coding | Concatenated RS and Convolution Coding |
| Wireless Channel | Frequency Selective Fading (based on 3GPP MIMO Channel) |
| Doppler Spread | 2 Hz (1 km/hr @ 2100 MHz) |
| Delay Spread | 12 µsec |
| Transmit Diversity | Yes (2 antennas) |
| Receive Diversity | Yes (2 antennas) |
| Channel Estimation | Delay restricted and zero-forcing channel estimation |
| Noise Variance Estimation | Realistic |
| Symbol Decoding | Soft |
| Synchronization | Ideal |
| MAC PDU Length | Variable |
| MAC SDU Length | Fixed (49 or 52 bytes) |
| Carrier Frequency | 2300 MHz |
| Bandwidth | 5 MHz |

Figure 7:
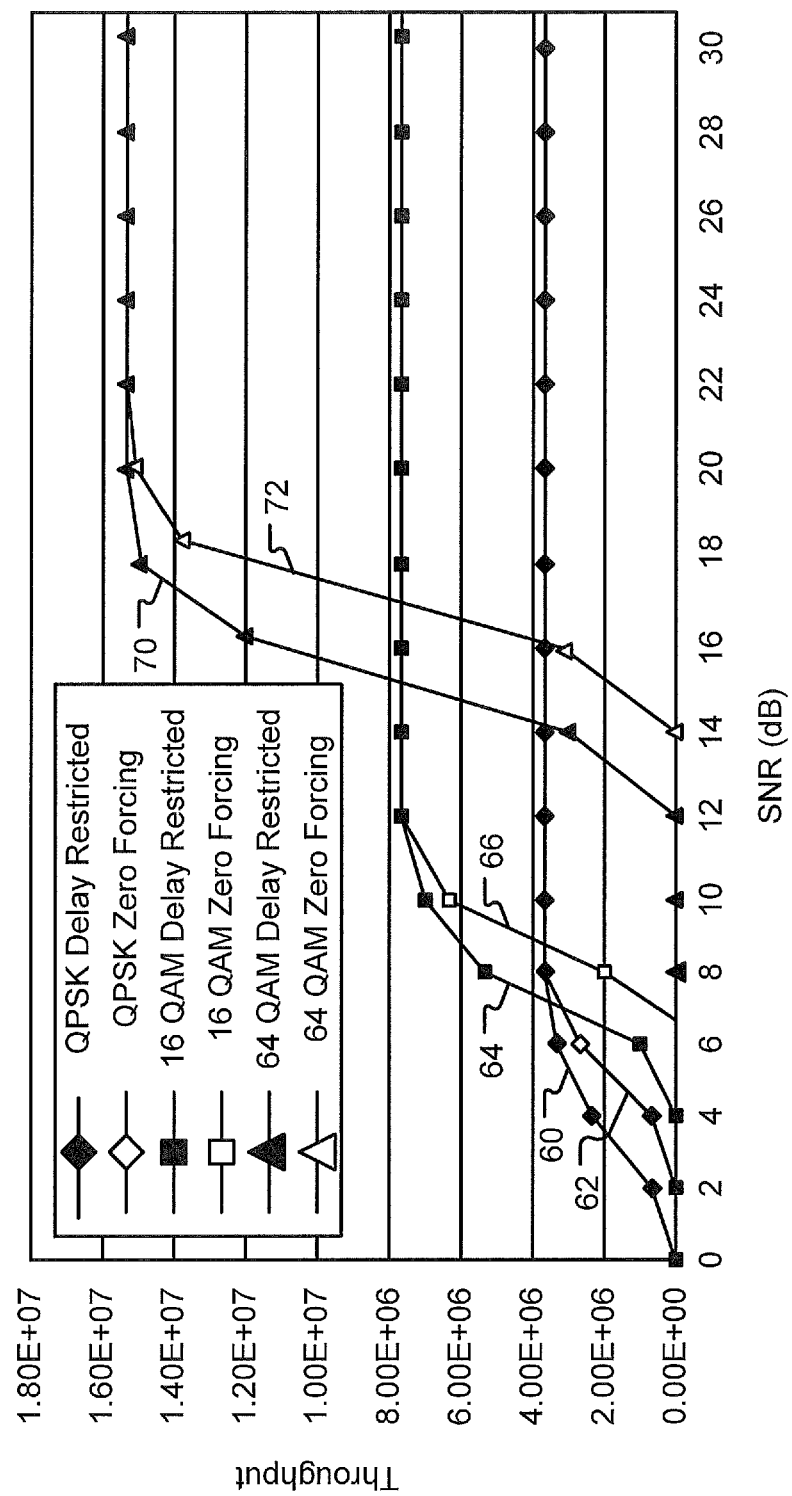
FIG. 7 illustrates graphs of throughput versus signal-to-noise ratio for simulations of the delay restricted channel estimation method.

FIG. 7 are graphs of throughput versus signal-to-noise ratio for simulations of the delay restricted channel estimation method. Graphs 60 and 62 illustrate the performance of delay-restricted and conventional zero-forcing channel estimation, respectively, for QPSK modulation. Graphs 64 and 66 illustrate the performance of delay-restricted and conventional zero-forcing channel estimation, respectively, for 16-QAM modulation. Graphs 70 and 72 illustrate the performance of delay-restricted and conventional zero-forcing channel estimation, respectively, for 64-QAM modulation.

The graphs show that the delay-restricted channel estimation has improved throughput compared to conventional zero-forcing channel estimation for QPSK, 16-QAM and 64-QAM modulation. The overall performance of the system improves by about 2 dB by using the delay restricted channel estimation algorithm, which implies that the system requires a signal to noise ratio (SNR) 2 dB lower than what would be required if this channel estimation algorithm was not used. A significant portion of the gain comes from more accurate channel estimation and significantly better noise variance estimation.

The herein-disclosed delay restricted channel estimation method and system can be implemented in a fixed wireless access system. In one embodiment, the fixed wireless access system is based on the WiMAX standard. This implementation would lead to an improvement in coverage and capacity in the fixed wireless access system.

The herein-disclosed delay-restricted channel estimation method and system can be implemented in mobile radio telephones (e.g. cellular telephones) and/or mobile radio telephone base stations. In one embodiment, the delay-restricted channel estimation method and system are implemented by one or more integrated circuits for mobile telephones (e.g. a mobile telephone chip set).

Generally, the acts and components described herein can be implemented using a computer system. The computer system is directed by computer program code stored by a computer-readable storage medium to perform the acts described.

It will be apparent to those skilled in the art that the disclosed embodiments may be modified in numerous ways and may assume many embodiments other than the particular forms specifically set out and described herein.

The above-disclosed subject matter is to be considered illustrative, and not restrictive, and the appended claims are intended to cover all such modifications, enhancements, and other embodiments that fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
   suppressing, at a device some but not all elements of a first matrix representing an estimate of a channel to obtain a suppressed estimate of the channel, wherein the first matrix is obtained from an operation on a second matrix and wherein the second matrix is a transform matrix to transform a set of symbols from a first domain representation to a second domain representation;
   multiplying, at the device, the suppressed estimate of the channel by a third matrix to obtain a delay restricted estimate of the channel; and
   demodulating a signal received via the channel based at least in part on the delay restricted estimate of the channel.

2. The method of claim 1, wherein the third matrix is a unitary matrix.

3. The method of claim 1, further comprising performing a channel estimation to obtain the estimate of the channel based on the received signal, wherein the channel estimation comprises a zero-forcing channel estimation.

4. The method of claim 3, further comprising determining a set of symbols of the received signal based on the delay restricted estimate of the channel.

5. The method of claim 4, wherein determining the set of symbols comprises dividing each received symbol of the received signal by a particular element of the delay restricted estimate of the channel.

6. The method of claim 3, further comprising estimating a noise variance from a noise estimate obtained by subtracting an estimated signal from the received signal.

7. The method of claim 6, wherein the estimated signal is determined by multiplying a preamble symbol matrix by the delay restricted estimate of the channel.

8. The method of claim 1, wherein the transform matrix is a Fourier transform matrix.

9. The method of claim 1, wherein the operation includes a singular value decomposition.

10. The method of claim 1, wherein suppression of an element of the second first matrix comprises setting the element to zero.

11. The method of claim 1, wherein the elements to be suppressed are determined based on a channel impulse response associated with the received signal and a number of sub-carriers associated with the received signal.

12. An apparatus, comprising:
   a suppressor configured to suppress some but not all elements of a first matrix representing a channel estimate to obtain a suppressed channel estimate of the channel, wherein a particular element of the first matrix is suppressed by setting the particular element to zero;
   a multiplier configured to multiply the suppressed channel estimate by a second matrix to obtain a delay restricted estimate of the channel, wherein the second matrix is unitary and is obtained from a singular value decomposition of a Fourier transform matrix; and
   a demodulator configured to demodulate a signal received via the channel based at least in part on the delay restricted estimate of the channel.

13. The apparatus of claim 12, further comprising:
   a channel estimator configured to compute the channel estimate based on the received signal; and
   an equalizer configured to equalize the received signal based on the delay restricted estimate.

14. The apparatus of claim 13, wherein the channel estimator is further configured compute the channel estimate based on a pilot symbol diagonal matrix, a vector of received symbols, the second matrix, or any combination thereof.

15. A computer-readable device, comprising instructions that, when executed by a processor, cause the processor to perform operations including:
   suppressing some but not all elements of a first matrix representing an estimate of a channel to obtain a suppressed estimate of the channel, wherein suppression of an element of the first matrix comprises setting the element to zero;
   multiplying the suppressed estimate of the channel by a second matrix to obtain a delay restricted estimate of the channel, wherein the second matrix is a unitary matrix obtained from a singular value decomposition of a Fourier transform matrix; and
   demodulating a signal received via the channel based at least in part on the delay restricted estimate of the channel.

16. The computer-readable device of claim 15, wherein the operations further comprise performing a channel estimation to obtain the estimate of the channel based on the received signal, wherein the channel estimate is obtained further based on an inverse of a pilot symbol diagonal matrix, a vector of received symbols, and a conjugate transpose of the second matrix.

* * * * *